United States Patent
Banatwala et al.

(10) Patent No.: US 10,380,549 B2
(45) Date of Patent: *Aug. 13, 2019

(54) ALLOWING A USER TO EASILY COLLABORATE WITH USERS FROM OUTSIDE ORGANIZATIONS WHERE THE USER HAS VISITOR STATUS BY SELECTING AN OBJECT ASSOCIATED WITH THE OUTSIDE ORGANIZATION THAT IS DISPLAYED ON THE USER INTERFACE OF THE USER'S COMPUTING DEVICE

(71) Applicant: International Business Machines Corporation, Armonk, NY (US)

(72) Inventors: Mustansir Banatwala, Hudson, NH (US); David A. Brooks, Arlington, MA (US); David L. Durazzano, Hooksett, NH (US); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,245

(22) Filed: Jul. 11, 2018

(65) Prior Publication Data
US 2018/0322459 A1 Nov. 8, 2018

Related U.S. Application Data

(63) Continuation of application No. 15/432,088, filed on Feb. 14, 2017, now Pat. No. 10,075,433, which is a (Continued)

(51) Int. Cl.
*H04L 29/06* (2006.01)
*G06Q 10/10* (2012.01)
(Continued)

(52) U.S. Cl.
CPC ........... *G06Q 10/101* (2013.01); *G06Q 10/10* (2013.01); *G06Q 50/01* (2013.01); *H04L 63/08* (2013.01);
(Continued)

(58) Field of Classification Search
None
See application file for complete search history.

(56) References Cited

U.S. PATENT DOCUMENTS 6,026,410 A * 2/2000 Allen ..................... G06Q 10/10
6,701,345 B1 3/2004 Carley et al.
(Continued)

FOREIGN PATENT DOCUMENTS

WO 2004027559 A2 4/2004

OTHER PUBLICATIONS

Vu, Nam G., "How to get Gmail notified when a label has new unread message," https://webapps.stackexchange.com/questions/27126/how-to-get-gmail-notified-when-a-label-has-new-unread-message, Mar. 12, 2013, pp. 1-3.
(Continued)

*Primary Examiner* — Farid Homayounmehr
*Assistant Examiner* — Olanrewaju J. Bucknor
(74) *Attorney, Agent, or Firm* — Robert A. Voigt, Jr.; Winstead, P.C.

(57) ABSTRACT

A method, system and computer program product for allowing a user to easily collaborate with users from different organizations. In response to authenticating the user to access the environment of the user's home organization, a list of outside organizations where the user has visitor status is obtained. Outside organization(s) in the list of outside organizations that have content to be viewed by the user are identified. An object associated with the user's home organization, objects associated with the outside organizations
(Continued)

where the user has visitor status as well as indications (e.g., star) associated with those outside organizations that have content to be shared with the user are displayed on the user interface of the user's computing device. In this manner, the user will be able to collaborate with an outside organization that has content to be shared in response to selecting the object associated with the outside organization.

12 Claims, 4 Drawing Sheets

Related U.S. Application Data continuation of application No. 14/701,225, filed on Apr. 30, 2015, now Pat. No. 9,679,272, which is a continuation of application No. 14/519,984, filed on Oct. 21, 2014.

(51) Int. Cl.
    *G06Q 50/00*        (2012.01)
    *H04L 29/08*        (2006.01)

(52) U.S. Cl.
    CPC ............ *H04L 63/083* (2013.01); *H04L 63/10* (2013.01); *H04L 63/101* (2013.01); *H04L 63/168* (2013.01); *H04L 65/403* (2013.01); *H04L 67/10* (2013.01)

(56) References Cited

U.S. PATENT DOCUMENTS

| | | | |
|---|---|---|---|
| 7,032,006 B2 | 4/2006 | Zhuk | |
| 7,353,252 B1 * | 4/2008 | Yang | G06Q 10/10 709/204 |
| 7,962,385 B2 | 6/2011 | Falk et al. | |
| 7,966,369 B1 | 6/2011 | Briere et al. | |
| 8,117,201 B2 | 2/2012 | Bhattacharjee et al. | |
| 8,392,962 B2 * | 3/2013 | Grason | G06F 17/2247 726/2 |
| 8,495,197 B1 | 7/2013 | Nagargadde et al. | |
| 8,498,994 B2 | 7/2013 | Prabaker et al. | |
| 8,639,552 B1 * | 1/2014 | Chen | G06F 9/4881 705/7.21 |
| 8,683,557 B1 * | 3/2014 | Desikan | G06F 21/45 709/204 |
| 8,788,590 B2 | 7/2014 | Culver et al. | |
| 8,955,146 B1 | 2/2015 | Rodgers et al. | |
| 9,256,840 B2 | 2/2016 | Said et al. | |
| 9,832,156 B2 * | 11/2017 | Lai | H04L 51/32 |
| 2003/0061330 A1 | 3/2003 | Frisco et al. | |
| 2003/0187763 A1 | 10/2003 | Jordan et al. | |
| 2005/0004982 A1 | 1/2005 | Vernon et al. | |
| 2005/0010454 A1 | 1/2005 | Falk et al. | |
| 2005/0033968 A1 | 2/2005 | Dupouy et al. | |
| 2005/0041793 A1 | 2/2005 | Fulton et al. | |
| 2005/0095569 A1 | 5/2005 | Franklin | |
| 2005/0097440 A1 | 5/2005 | Lusk et al. | |
| 2008/0046442 A1 | 2/2008 | Grason et al. | |
| 2008/0133580 A1 | 6/2008 | Wanless et al. | |
| 2009/0006467 A1 | 1/2009 | Visscher | |
| 2009/0133100 A1 | 5/2009 | Buchwald et al. | |
| 2011/0238760 A1 | 9/2011 | Kuruganti et al. | |
| 2012/0096521 A1 | 4/2012 | Peddada | |
| 2012/0198358 A1 | 8/2012 | Carrer et al. | |
| 2013/0144945 A1 | 6/2013 | Said et al. | |
| 2013/0173798 A1 | 7/2013 | Micucci et al. | |
| 2013/0179515 A1 | 7/2013 | Chi et al. | |
| 2013/0197967 A1 * | 8/2013 | Pinto | G06Q 10/0637 705/7.28 |
| 2013/0231980 A1 | 9/2013 | Elgart et al. | |
| 2013/0254397 A1 | 9/2013 | Lai et al. | |
| 2015/0135043 A1 | 5/2015 | Apps et al. | |

OTHER PUBLICATIONS

Eliot, Adele, "Can You be Added to Someone's Network if You're Not on Linkedin?," http://smallbusiness.chron.com/can-added-someones-network-not-linkedin-27677.html, Mar. 12, 2013, one page.

List of IBM Patents or Patent Applications Treated as Related, Jul. 12, 2018, pp. 1-2.

Office Action for U.S. Appl. No. 16/033,389 dated Nov. 20, 2018, pp. 1-14.

* cited by examiner

ALLOWING A USER TO EASILY
COLLABORATE WITH USERS FROM
OUTSIDE ORGANIZATIONS WHERE THE
USER HAS VISITOR STATUS BY
SELECTING AN OBJECT ASSOCIATED
WITH THE OUTSIDE ORGANIZATION
THAT IS DISPLAYED ON THE USER
INTERFACE OF THE USER'S COMPUTING
DEVICE

TECHNICAL FIELD

The present invention relates generally to social network services, and more particularly to allowing a user to easily collaborate with users from different outside organizations where the user has visitor status by selecting an object associated with the outside organization that is displayed on the user interface of the user's computing device thereby enabling data to be easily shared among organizations collaborating amongst each other.

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web based and provide means for users to interact over the Internet, such as by e-mail and instant messaging. Social networking sites allow users to share ideas, activities, events, and interests within their individual networks.

In a multi-tenant social networking environment, where a tenant is an organization, each tenant needs to keep their data segregated from each other tenant for security and privacy purposes. However, there may be situations when multiple tenants are cooperating with one another, such as in a business-to-business environment, and desire to have their data safely shared with one another.

Currently, in order for organizations to share data amongst each other, a user of one organization (e.g., organization A) may be provided an account with the other organization (e.g., organization B). The user of organization A would then log into the environment or tenant space of organization B to access data and interact with users in organization B. However, requiring the user to log into another environment or tenant space is time consuming and inefficient.

Alternatively, a user in organization B may have to explicitly share the data with the user in organization A, such as by e-mail. The user in organization B would then have to explicitly share the data every time organization B needs to share some data with organization A. Such a process is laborsome, time consuming and inefficient.

Hence, there is not currently a means for allowing users of organizations to easily share data amongst each other in an efficient, user friendly manner.

SUMMARY

In one embodiment of the present invention, a method for allowing a user to easily collaborate with users from different organizations comprises receiving an invite request by a first user to collaborate with a second user from an outside organization, where the first user is granted visitor status with the outside organization, and where the outside organization associates authentication credentials of the first user with the outside organization thereby acknowledging that the first user has access to an environment of the outside organization. The method further comprises obtaining the authentication credentials from the outside organization to log into the outside organization in response to receiving the invite request by the first user to collaborate with the second user from the outside organization. The method additionally comprises receiving user authentication credentials from a computing device of the first user to log into a tenant space of a home organization. Furthermore, the method comprises obtaining a list of outside organizations where the first user has visitor status in response to authenticating the first user to access the tenant space of the home organization upon receiving the user authentication credentials from the computing device. Additionally, the method comprises searching and identifying one or more outside organizations in the list of outside organizations that have content to be viewed by the first user. In addition, the method comprises displaying on a user interface of the computing device of the first user the following: an object associated with the home organization and objects associated with outside organizations in the list of outside organizations where the first user has visitor status and one or more indications associated with the one or more organizations in the list of outside organizations with content to be viewed by the first user.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 6 is a flowchart of a method for automatically logging into an outside organization where the user has visitor status in response to the user selecting an object associated with the outside organization displayed on the

DETAILED DESCRIPTION

Figure 1:
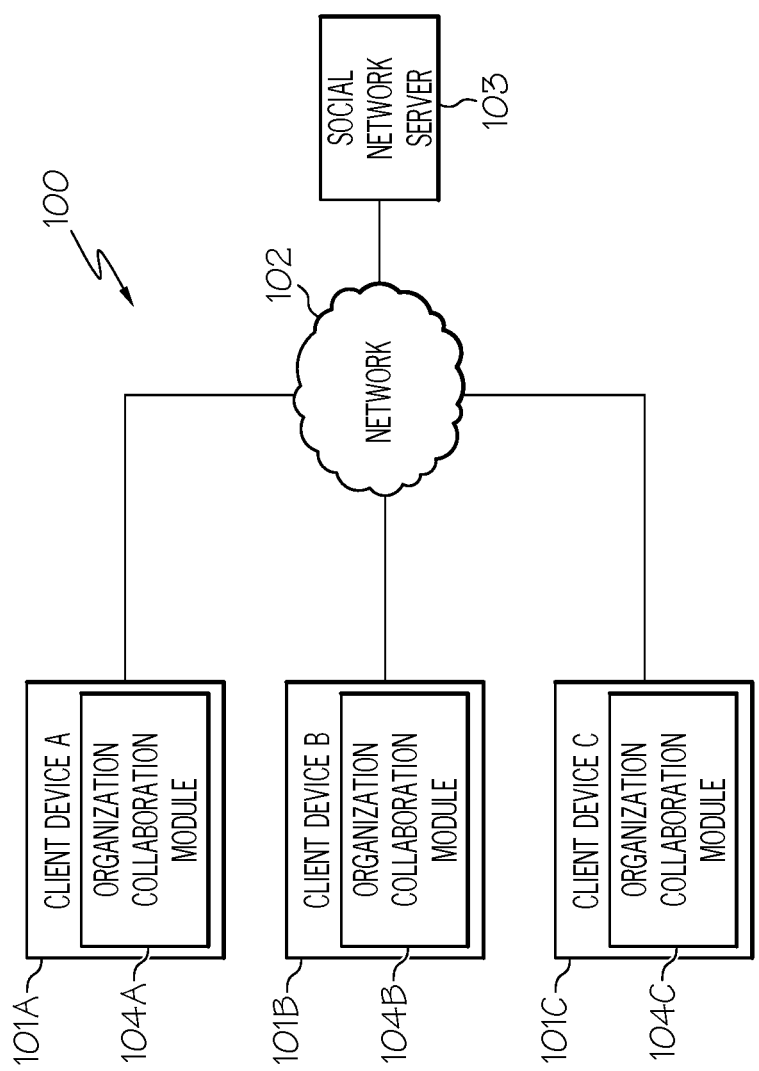
FIG. 1 illustrates a multi-tenant social network system configured in accordance with an embodiment of the present invention.

The present invention comprises a method, system and computer program product for allowing a user to easily collaborate with users from different organizations. In one embodiment of the present invention, authentication credentials (e.g., login identification and password) are received from the user to log into the environment or tenant space of the user's home organization. In response to authenticating the user to access the environment/tenant space of the user's home organization, a list of outside organizations where the user has visitor status is obtained. Outside organization(s) in the list of outside organizations where the user has visitor status that have content to be viewed by the user are identified. For example, a user from an outside organization may inform a software module, referred to herein as the "organization collaboration module," regarding content to be shared with the user. The organization collaboration module maintains a list of such organizations with content to be shared with the user. Once the content is shared with the user, those outside organizations are removed from the list of organizations with content to be shared with the user. The organization collaboration module then displays on the user interface of the user's computing device an object associated with the user's home organization as well as the objects associated with the outside organizations where the user has visitor status as well as displays an indication (e.g., asterisk, star) associated with those outside organizations that have content to be shared with the user. In this manner, the user will know when an outside organization has content to be shared. Furthermore, in response to the user selecting one of the objects associated with an outside organization, the user is automatically logged into the environment/tenant space of the outside organization thereby enabling data to be shared amongst organizations in an efficient, user friendly manner.

While the following discusses the present invention in connection with social network services, the principles of the present invention may be applied to other services, such as file-sharing services. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a multi-tenant social network system 100 configured in accordance with an embodiment of the present invention. Referring to FIG. 1, social network system 100 includes a community of users of various organizations (tenants) using client devices 101A-101C (identified as "Client Device A," "Client Device B," and "Client Device C," respectively, in FIG. 1) to be involved in multi-tenant social network system 100. Client devices (also referred to as "computing devices") 101A-101C may collectively or individually be referred to as client devices 101 or client device 101, respectively. Each user of client device 101 may be a worker/employee for a unique organization or multiple users of client devices 101 may be workers/employees for the same organization. For example, users of client devices 101A-101B may be workers/employees for the same organization while the user of client device 101C is a worker/employee of a different organization. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 103 is connected to network 102 by wire or wirelessly. Social network server 103, as used herein, is configured to enable various collaborative activities among the users of client devices 101. While FIG. 1 illustrates a single social network server 103, it is noted for clarity that multiple servers may be used to implement the social networking and/or microblogging service.

Furthermore, as illustrated in FIG. 1, client devices 101A-101C include a software agent, referred to herein as the "organization collaboration module" 104A-104C, respectively, configured to allow a user to easily collaborate with users from different organizations the user has visitor status by simply selecting an object associated with such an organization that is displayed on the user interface of the user's computing device 101 as discussed in further detail below. Organization collaboration modules 104A-104C may collectively or individually be referred to as organization collaboration modules 104 or organization collaboration module 104, respectively. A description of the hardware configuration of client device 101 is provided below in connection with FIG. 2.

System 100 is not to be limited in scope to any one particular network architecture. System 100 may include any number of client devices 101, networks 102 and social network servers 103.

Figure 2:
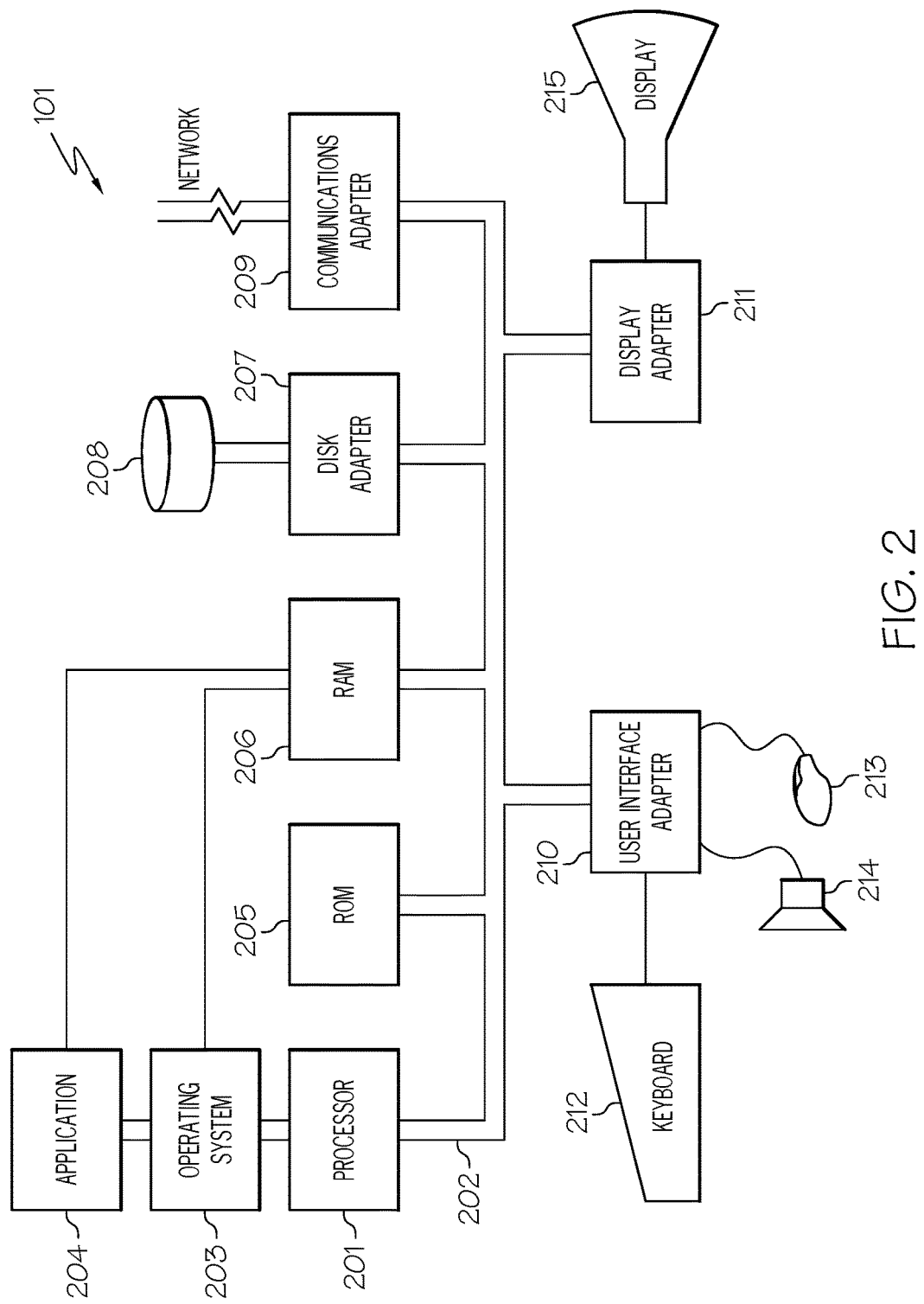
FIG. 2 illustrates a hardware configuration of a client device configured in accordance with an embodiment of the present invention.

Referring now to FIG. 2, FIG. 2 illustrates a hardware configuration of client device 101 (FIG. 1) which is representative of a hardware environment for practicing the present invention. Referring to FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, organization collaboration module 104 (FIG. 1) configured to allow a user to easily collaborate with users from different organizations the user has visitor status by simply selecting an object associated with such an organization that is displayed on the user interface of the user's computing device 101 as discussed further below in association with FIGS. 3-6.

Referring again to FIG. 2, read-only memory ("ROM") 205 is coupled to system bus 202 and includes a basic input/output system ("BIOS") that controls certain basic functions of client device 101. Random access memory ("RAM") 206 and disk adapter 207 are also coupled to system bus 202. It should be noted that software components including operating system 203 and application 204 may be loaded into RAM 206, which may be client device's 101 main memory for execution. Disk adapter 207 may be an integrated drive electronics ("IDE") adapter that communicates with a disk unit 208, e.g., disk drive. It is noted that the program (organization collaboration module 104) for allowing a user to easily collaborate with users from different organizations the user has visitor status by simply selecting an object associated with such an organization that is displayed on the user interface of the user's computing device 101, as discussed further below in association with FIGS. 3-6, may reside in disk unit 208 or in application 204.

Client device 101 may further include a communications adapter 209 coupled to bus 202. Communications adapter 209 interconnects bus 202 with an outside network (e.g., network 102 of FIG. 1) thereby enabling client device 101 to communicate with other client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in a multi-tenant social networking environment, where a tenant is an organization, each tenant needs to keep their data segregated from each other tenant for security and privacy purposes. However, there may be situations when multiple tenants are cooperating with one another, such as in a business-to-business environment, and desire to have their data safely shared with one another. Currently, in order for organizations to share data amongst each other, a user of one organization (e.g., organization A) may be provided an account with the other organization (e.g., organization B). The user of organization A would then log into the environment or tenant space of organization B to access data and interact with users in organization B. However, requiring the user to log into another environment or tenant space is time consuming and inefficient. Alternatively, a user in organization B may have to explicitly share the data with the user in organization A, such as by e-mail. The user in organization B would then have to explicitly share the data every time organization B needs to share some data with organization A. Such a process is laborsome, time consuming and inefficient. Hence, there is not currently a means for allowing users of organizations to easily share data amongst each other in an efficient, user friendly manner.

Figure 3:
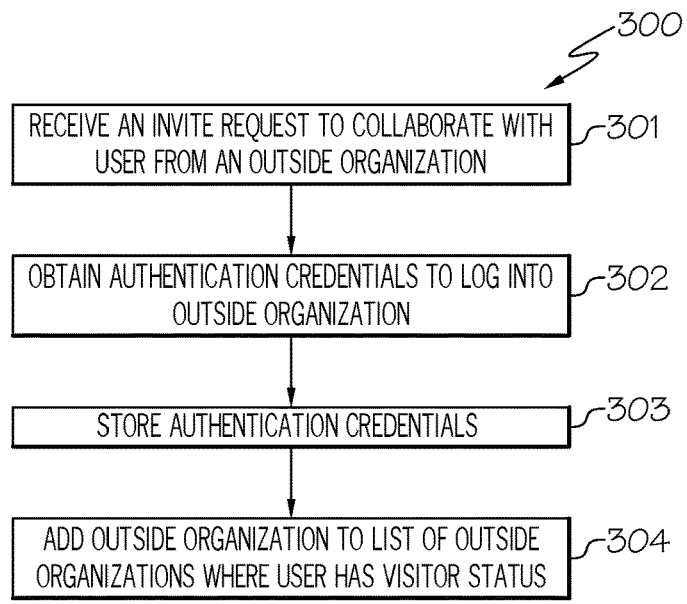
FIG. 3 is a flowchart of a method for adding an outside organization to a list of outside organizations where the user has visitor status in accordance with an embodiment of the present invention.
Figure 4:
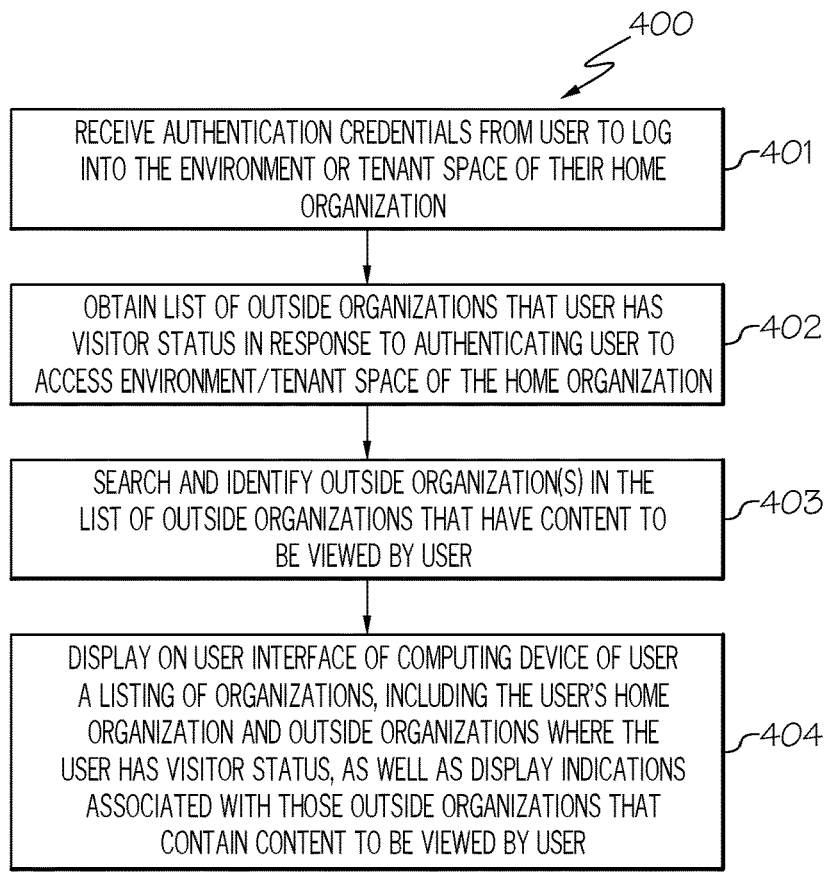
FIG. 4 is a flowchart of a method for displaying a listing of organizations, including the home organization and outside organizations where the user has visitor status, in response to the user logging into the home organization in accordance with an embodiment of the present invention.
Figure 5:
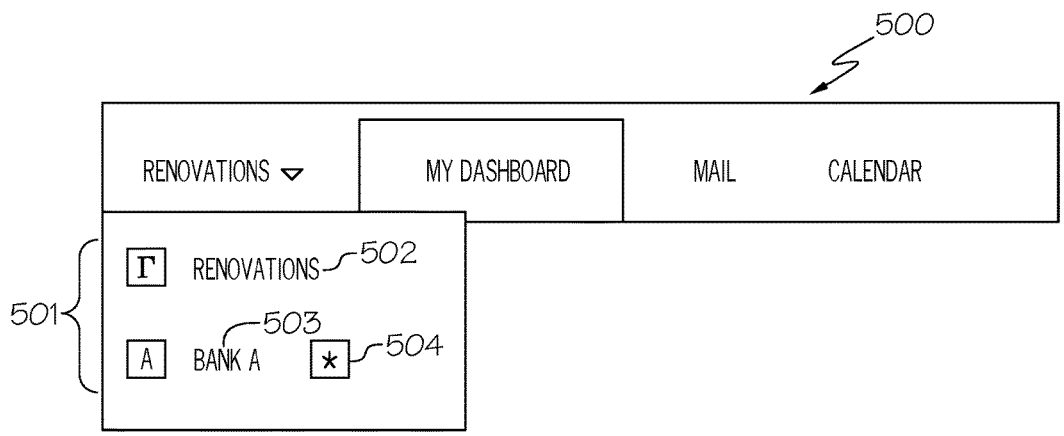
FIG. 5 is a screenshot of the user interface on the user's client device illustrating the display of a list of organizations, including the home organization and outside organizations where the user has visitor status, as well as the display of indications associated with those organizations with content to be viewed by the user in accordance with an embodiment of the present invention.
Figure 6:
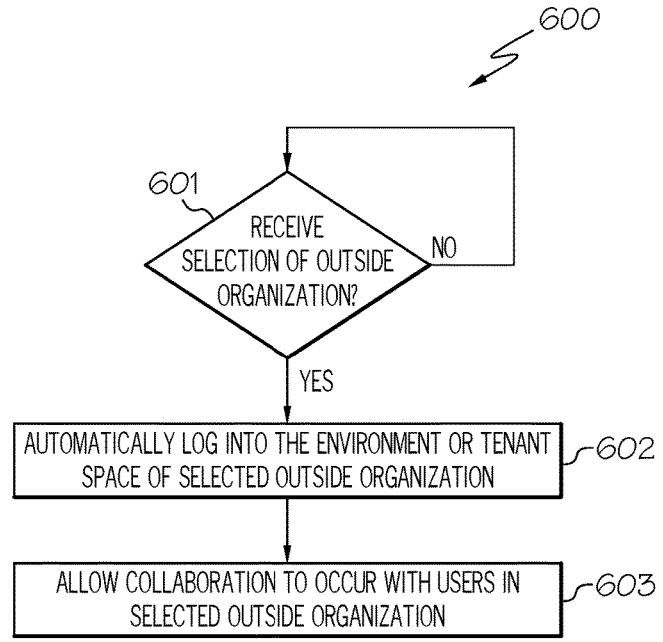

The principles of the present invention provide a means for allowing a user to easily collaborate with users from different organizations the user has visitor status by simply selecting an object associated with such an organization that is displayed on the user interface of the user's computing device 101 (FIG. 1) as discussed further below in association with FIGS. 3-6. FIG. 3 is a flowchart of a method for adding an outside organization to a list of outside organizations where the user has visitor status. FIG. 4 is a flowchart of a method for displaying a listing of organizations, including the home organization and outside organizations where the user has visitor status, in response to the user logging into the home organization. FIG. 5 is a screenshot of the user interface on the user's client device illustrating the display of a list of organizations, including the home organization and outside organizations where the user has visitor status, as well as the display of indications associated with those organizations with content to be viewed by the user. FIG. 6 is a flowchart of a method for automatically logging into an outside organization the user has visitor status in response to the user selecting an object associated with the outside organization displayed on the user interface of the user's client device.

As stated above, FIG. 3 is a flowchart of a method 300 for adding an outside organization to a list of outside organizations where the user has visitor status in accordance with an embodiment of the present invention.

Referring to FIG. 3, in conjunction with FIGS. 1-2, in step 301, organization collaboration module 104 receives an invite request by a user (e.g., user of client device 101A) to collaborate with a user (e.g., user of client device 101B) from an outside organization. In such a scenario, the user who receives the invite request is said to be granted "visitor" status with the requesting outside organization.

In step 302, organization collaboration module 104 obtains the authentication credentials (e.g., login identification and password) from the outside organization to log into the outside organization. Furthermore, the organization that issued the invite request also associates the user's authentication credentials with that organization thereby acknowledging that the user has access to the environment of the organization that issued the invite request.

In step 303, organization collaboration module 104 stores the obtained authentication credentials, which may be stored in memory or storage of client device 101 (e.g., memory 205, disk unit 208).

In step 304, organization collaboration module 104 adds the outside organization to a list of outside organizations where the user has visitor status, where such a list may be stored in memory or storage of client device 101 (e.g., memory 205, disk unit 208).

Once the outside organization is added to the list of outside organizations where the user has visitor status, an object (e.g., icon) associated with the outside organization, as well as for the other outside organizations, will be displayed on the user interface of the user's client device 101 enabling the user to easily collaborate with users from an outside organization by simply selecting an object associated with the outside organization as discussed further below. The display of the list of outside organizations is discussed below in connection with FIG. 4.

FIG. 4 is a flowchart of a method 400 for displaying a listing of organizations, including the home organization and outside organizations where the user has visitor status, in response to the user logging into the home organization in accordance with an embodiment of the present invention.

Referring to FIG. 4, in conjunction with FIGS. 1-3, in step 401, organization collaboration module 104 receives authentication credentials (e.g., login identification and password) from the user (e.g., user of client device 101A) to log into the environment or tenant space of the user's home organization.

In step 402, organization collaboration module 104 obtains the list of outside organizations where the user has visitor status in response to authenticating the user to access the environment/tenant space of the user's home organization upon receiving the authentication credentials in step 401. As discussed above, a list of outside organizations where the user has visitor status may be stored in memory or storage of client device 101 (e.g., memory 205, disk unit 208) which may be searched to identify those outside organizations where the user has visitor status.

In step 403, organization collaboration module 104 searches and identifies outside organization(s) in the list of outside organizations where the user has visitor status that have content to be viewed by the user. In one embodiment, organization collaboration module 104 communicates with the outside organizations in the list of outside organizations where the user has visitor status, such as communicating with a module at the outside organization similar to organization collaboration module 104, to determine if there is content to be viewed by the user. In another embodiment, each user from an outside organization informs organization collaboration module 104 regarding content to be shared with the user. For example, the user in the outside organization may alert organization collaboration module 104 that he/she commented on one of the user's artifacts (e.g., class diagram). Other examples of organization collaboration module 104 identifying content to be shared with the user may involve organization collaboration module 104 detecting the user's name being mentioned in a post by a user from an outside organization or detecting a threshold number of people (e.g., ten) that liked what the user had posted on a social media website (such as via a like button on the social media website) by users from an outside organization, etc. In these examples, organization collaboration module 104 is configured to search and review posts on a social networking feed and utilize natural language processing for discovering content to be shared with the user from an outside organization that the user has visitor status. For instance, organization collaboration module 104 may identify posts that discuss the user by identifying the user's name in the posted message. In another example, organization collaboration module 104 may identify the number of "likes" by identifying the string of "people like this" following the user's posting. Organization collaboration module 104 maintains a list of organizations with content to be shared with the user, where such a list may be stored in memory or storage of client device 101 (e.g., memory 205, disk unit 208). Once the content is shared with the user, those outside organizations are removed from the list of organizations with content to be shared with the user.

In step 404, organization collaboration module 104 displays on the user interface of client device 101 (e.g., client device 101A) an object associated with the user's home organization as well as the objects associated with the outside organizations in the list of outside organizations where the user has visitor status as well as displays an indication (e.g., asterisk, star) associated with those outside organizations that have content to be shared with the user (the identity of those outside organizations is obtained in step 403) as illustrated in FIG. 5 (discussed below). By displaying objects associated with outside organizations, the user can easily collaborate with those organizations by simply selecting the object associated with that organization as discussed further below.

FIG. 5 is a screenshot of the user interface 500 on the user's client device 101 (FIG. 1) illustrating the display of a list of organizations, including the home organization and outside organizations where the user has visitor status, as well as the display of indications (e.g., star) associated with those organizations with content to be viewed by the user in accordance with an embodiment of the present invention.

Referring to FIG. 5, in conjunction with FIGS. 1-4, user interface 500 includes a listing 501 of organizations, including the user's home organization 502 (home organization of the user is "Renovations") as well as any outside organizations 503 (e.g., outside organization of "Bank A") where the user has visitor status. Furthermore, as illustrated in FIG. 5, indication 504 (e.g., star) is associated with the outside organization of "Bank A" thereby informing the user that the Bank A organization has content to be viewed by the user. In this manner, the user will know when an outside organization has content to be shared with the user thereby enabling data to be shared amongst organizations in an efficient, user friendly manner.

A discussion regarding the user selecting one of the outside organizations listed on the user interface of the user's computing device to collaborate is discussed below in connection with FIG. 6.

FIG. 6 is a flowchart of a method 600 for automatically logging into an outside organization the user has visitor status in response to the user selecting an object associated with the outside organization displayed on the user interface of the user's client device 101 (e.g., client device 101A) in accordance with an embodiment of the present invention.

Referring to FIG. 6, in conjunction with FIGS. 1-5, in step 601, a determination is made by organization collaboration module 104 as to whether it received from the user a selection of an outside organization from the list of outside organizations (e.g., outside organization 503) displayed to the user, such as by the user selecting the object associated with the outside organization displayed on the user interface of the user's client device 101.

If the user has not selected an outside organization, then organization collaboration module 104 continues to determine whether it received from the user a selection of an outside organization from the list of outside organizations (e.g., outside organization 503) displayed to the user in step 601.

If, however, organization collaboration module 104 received a selection of an object associated with one of the outside organizations displayed on the user interface of the user's client device (e.g., outside organization 503), then, in step 602, organization collaboration module 104 automatically logs into the environment or tenant space of the selected outside organization using the authentications credentials (e.g., login identification and password) obtained from the outside organization in step 302. In this manner, the user is automatically logged into the environment/tenant space of the outside organization by simply selecting the object associated with the outside organization without having to manually log into the environment/tenant space of the outside organization.

In step 603, organization collaboration module 104 allows collaboration to occur between the home organization and the selected outside organization. That is, collaboration is now able to occur between the user of the home organization and users in the selected outside organization. In one embodiment, such collaboration occurs in a cloud environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for allowing a user to easily collaborate with users from different organizations, the computer program product comprising a non-transitory computer readable storage medium having program code embodied therewith, the program code comprising the programming instructions for:

receiving an invite request by a first user to collaborate with a second user from an outside organization, wherein said first user is granted visitor status with said outside organization, wherein said outside organization associates authentication credentials of said first user with said outside organization thereby acknowledging that said first user has access to an environment of said outside organization;

obtaining said authentication credentials from said outside organization to log into said outside organization in response to receiving said invite request by said first user to collaborate with said second user from said outside organization;

receiving user authentication credentials from a computing device of said first user to log into a tenant space of a home organization;

obtaining a list of outside organizations where said first user has visitor status in response to authenticating said first user to access said tenant space of said home organization upon receiving said user authentication credentials from said computing device;

searching and identifying one or more outside organizations in said list of outside organizations that have content to be viewed by said first user; and displaying on a user interface of said computing device of said first user the following: an object associated with said home organization and objects associated with outside organizations in said list of outside organizations where said first user has visitor status and one or more indications associated with said one or more organizations in said list of outside organizations with content to be viewed by said first user.

2. The computer program product as recited in claim 1, wherein the program code further comprises the programming instructions for:

adding said outside organization to said list of outside organizations where said first user has visitor status.

3. The computer program product as recited in claim 2, wherein the program code further comprises the programming instructions for:

storing said user authentication credentials received from said computing device to log into said outside organization.

4. The computer program product as recited in claim 3, wherein the program code further comprises the programming instructions for:

receiving a selection of an object associated with said outside organization; and automatically logging into a tenant space of said outside organization using said obtained authentication credentials to log into said outside organization in response to receiving said selection of said object associated with said outside organization.

5. The computer program product as recited in claim 4, wherein the program code further comprises the programming instructions for:

allowing collaboration to occur between said first user and said second user.

6. The computer program product as recited in claim 5, wherein said collaboration between said first user and said second user occurs in a cloud environment.

7. A system, comprising:

a memory for storing a computer program for allowing a user to easily collaborate with users from different organizations; and a processor connected to said memory, wherein said processor is configured to execute the program instructions of the computer program comprising:

receiving an invite request by a first user to collaborate with a second user from an outside organization, wherein said first user is granted visitor status with said outside organization, wherein said outside organization associates authentication credentials of said first user with said outside organization thereby acknowledging that said first user has access to an environment of said outside organization;

obtaining said authentication credentials from said outside organization to log into said outside organization in response to receiving said invite request by said first user to collaborate with said second user from said outside organization;

receiving user authentication credentials from a computing device of said first user to log into a tenant space of a home organization;

obtaining a list of outside organizations where said first user has visitor status in response to authenticating said first user to access said tenant space of said home organization upon receiving said user authentication credentials from said computing device;

searching and identifying one or more outside organizations in said list of outside organizations that have content to be viewed by said first user; and displaying on a user interface of said computing device of said first user the following: an object associated with said home organization and objects associated with outside organizations in said list of outside organizations where said first user has visitor status and one or more indications associated with said one or more organizations in said list of outside organizations with content to be viewed by said first user.

8. The system as recited in claim 7, wherein the program instructions of the computer program further comprise:

adding said outside organization to said list of outside organizations where said first user has visitor status.

9. The system as recited in claim 8, wherein the program instructions of the computer program further comprise:

storing said user authentication credentials received from said computing device to log into said outside organization.

10. The system as recited in claim 9, wherein the program instructions of the computer program further comprise:

receiving a selection of an object associated with said outside organization; and automatically logging into a tenant space of said outside organization using said obtained authentication credentials to log into said outside organization in response to receiving said selection of said object associated with said outside organization.

11. The system as recited in claim 10, wherein the program instructions of the computer program further comprise:

allowing collaboration to occur between said first user and said second user.

12. The system as recited in claim 11, wherein said collaboration between said first user and said second user occurs in a cloud environment.

\* \* \* \* \*